United States Patent [19]
Yonehara

[11] 4,069,446
[45] Jan. 17, 1978

[54] SPEED CONTROL MEANS FOR AC MOTOR

[75] Inventor: Hiroshi Yonehara, Oizumi, Japan

[73] Assignee: Sanwa Chemical Co., Ltd., Japan

[21] Appl. No.: 631,462

[22] Filed: Nov. 12, 1975

[30] Foreign Application Priority Data

Nov. 30, 1974 Japan .................................. 49-137933
Sept. 29, 1975 Japan .................................. 50-117995

[51] Int. Cl.² ............................................. H02P 3/02
[52] U.S. Cl. ............................... 318/466; 307/252 B;
318/331; 323/24
[58] Field of Search ................ 318/331, 341, 345 CA,
318/345 AB, 345 H, 466, 265, 267, 468;
302/252 B; 323/225 C, 24

[56] References Cited
U.S. PATENT DOCUMENTS

| 3,369,167 | 2/1968 | Hanchett | 318/331 |
| 3,508,134 | 4/1970 | Dosch et al. | 318/331 |
| 3,619,656 | 11/1971 | Domke | 307/252 B |
| 3,622,854 | 11/1971 | Imai | 318/468 |
| 3,731,182 | 5/1973 | Hirono et al. | 307/252 B |
| 3,783,361 | 1/1974 | Mason | 318/331 |
| 3,848,168 | 11/1974 | Hornung | 318/331 |

Primary Examiner—David Smith, Jr.
Attorney, Agent, or Firm—Wenderoth, Lind & Ponack

[57] ABSTRACT

An unbalanced switching circuit is connected with a bi-directional control rectifier in such a manner that variance of counter electro motive forces produced by rotation of an AC motor affects the lower switching voltage in the unbalanced switching circuit through diodes and a capacitor to increase or decrease the conduction angle of the bi-directional control rectifier.

5 Claims, 9 Drawing Figures

SPEED CONTROL MEANS FOR AC MOTOR

BACKGROUND OF THE INVENTION

This invention relates to a speed control means for an AC motor, and especially, for an AC commutator motor.

In the control of an AC motor to be used in any electrical driving means or machines such as machine tools or sewing machines, it is desired that the motor be rotated at a desired rotary speed with its output torque being kept constant irrespective of any variation in the loads applied thereto.

However, when a load is applied to a conventional AC motor which has been put in motion to be driven a desired rotary speed by the adjustment of a control resistance and the motor is rotating at the desired speed under the effect of the electric power supplied to the motor through the control resistance, the rotary speed of the motor is lowered when a load is applied and the desired rotary speed of the motor cannot be maintained without readjusting the control resistance thereof.

In addition, the output torque of the conventional AC motor is very low while the motor is rotating at a low rotary speed, so that it has almost been impossible to use a conventional AC motor for both high load and low speed operation.

In view of such disadvantages of the conventional electric motor, improvements have been made by the present invention.

That is, a main object of the present invention is to provide a speed control means for an AC motor by which the motor is rotated at a predetermined rotary speed with its output torque being kept substantially to constant irrespective of the variance of the loads.

Another object of the present invention is to provide a speed control means for an AC motor by which the motor can be caused to produce a desired output torque even at a very low rotary speed of the motor.

A further object of the present invention is to provide a speed control means for an AC motor by which the rotary speed of the motor can be adjusted from a very slow speed to a high speed obtained by directly connecting the motor to an alternating current source while keeping the output torque of the motor substantially constant.

Still another object of the present invention is to provide a speed control means as described above which is constructed from a very small number of circuit elements.

Another object of the present invention is to provide a speed control means for use in connection with a position setting means for an AC motor by which the motor can be caused to stop rotating at a desired rotary position.

Still another object of the present invention is to provide a speed control means for use in connection with a position setting means for an AC motor used for periodical mechanical operations wherein the position setting means functions to stop the rotation of the motor at a desired rotary position to assure safe mechanical operations.

BRIEF SUMMARY OF THE INVENTION

In the speed control means for an AC motor according to the present invention, an unbalanced switching means is connected with a bidirectional control rectifier in such a manner that variance of counter electro motive forces produced by the rotation of the motor affects the lower switching voltage in the unbalanced switching means through diodes and a capacitor to increase or decrease the conduction angle of the bi-directional control rectifier.

The aforementioned and other objects and features of the present invention will be described hereinafter in detail with reference to preferred embodiments thereof shown in the accompanying drawings, in which:

DETAILED DESCRIPTION OF THE INVENTION

Figure 1:
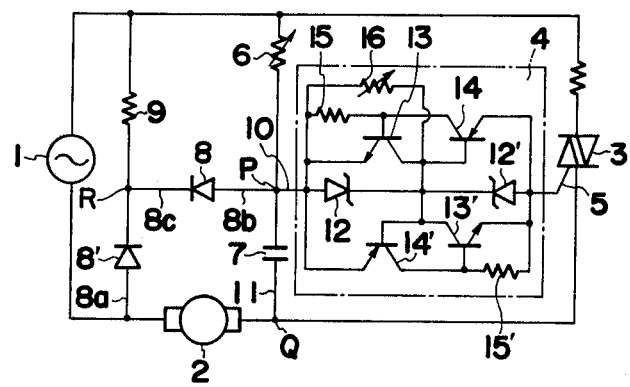
FIG. 1 is a diagram of an electric circuit of the speed control means for an AC commutator motor according to the present invention.

Reference is now made to the electric circuit shown in FIG. 1 constituting the motor speed control means of the present invention. In this electric circuit, connected in series with an AC source 1 (for example, 100V and 50 cycles) are an AC commutator motor 2 (for example, NATIONAL Sewing Machine Motor DY-701A) and a bilateral control rectifier 3 such a TRIAC (for example, MITUBISHI BCR 3AM). A control resistance 6, such as a variable resistance or a photoconductive cell using CdS, for setting the motor 2 to a desired rotary speed is connected in series with a capacitor 7 (for example, 1.0 $\mu$ F), and the control resistance 6 and capacitor 7 are in turn connected in series with the AC source 1 and the motor 2 and in parallel with the control rectifier 3. A diode 8' (for example, SANYO D17) and a resistance 9 (for example, 10KΩ) connected in series are also connected in series with the AC source 1 and in parallel with the motor and control rectifier 3 in such manner that the anode side 8a of the diode 8' is connected between the electric source 1 and the motor 2. Another diode 8 (for example SANYO D17) is provided, the anode side 8b of which is connected at a point P to the junction between the control resistance 6 and the capacitor 7 and the cathode side 8c of which is connected at the junction R between the diode 8' and the resistance 9.

Figure 2:
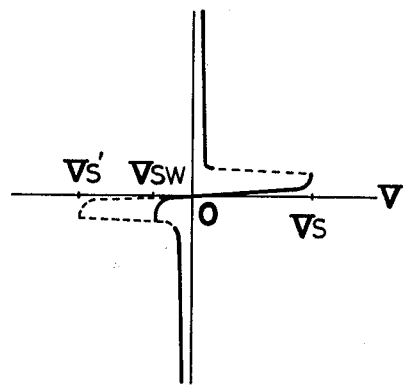
FIG. 2 is a graph showing a static characteristic of a bi-directional switching means used in the circuit of FIG. 1.

Connected between the point P and the gate terminal 5 of the bi-directional control rectifier 3 is a bi-directional switching trigger circuit 4 for applying trigger signals to the gate terminal 5 of the bi-directional control rectifier 3 to change the conduction angle of the rectifier and thereby to control the supply of electric power to the motor. The bi-directional switching trigger circuit 4 used herein is of the type in which the switching voltages $V_s$ and $V_{sw}$ in the positive and negative directions, respectively, are unbalanced as shown in FIG. 2, and the circuit 4 is therefore referred to hereinafter as an "unbalanced switching circuit."

The unbalanced switching circuit 4 is inside of the dash-dotted line in FIG. 1 and can be divided into two symmetrically connected circuit portions each comprising a voltage regulator diode 12 or 12' (for example zener diode), two transistors 13 and 13' and 14 and 14', and a resistance 15 and 15' for preventing leakage, and a semifixed resistance 16 is connected in parallel to one of the voltage regulator diodes 12. In this circuit, a switching voltage relative to an input voltage at the terminal, to which the gate 5 is connected, increases or decreases in accordance with the increase or decrease of the value of the semifixed resistance 16. However, when the value of the resistance 16 is made sufficiently high, the switching voltage is determined by the voltage regulator diode 12 and thereby becomes $Vs'$. If the symmetrically connected circuit elements 12–12', 13–13', 14–14' and 15–15' have the same characteristics, respectively, the switching voltage of $Vs$ in the positive direction becomes equal to that of $Vs'$ in the negative direction.

In the present unbalanced switching circuit 4, the switching voltages in the positive and negative directions are essentially determined by the voltage regulator diodes 12 and 12', so that the semifixed resistance 16 may be omitted. The semifixed resistance 16 is used in the circuit to make the unbalanced switching circuit useful under variable conditions.

In the operation of the control circuit shown in FIG. 1, after adjustment by which the control resistance 6 is adjusted to a high value and the alternating current is supplied in the circuit from the AC source 1, when a positive voltage is applied to the electrode of the capacitor 7 on the side toward point P by the positive half cycle of the alternating current, the capacitor 7 is positively charged at this electrode by the increase of the voltage with a time constant determined by the capacitor 7 and the control resistance 6, and the capacitor is discharged with a corresponding decrease of the voltage charge thereon with a time constant determined by the capacitor 7 and resistance 9 or with a time constant determined by the capacitor 7, resistance 9 and control resistance 6. On the other hand, when a positive voltage is applied to the other electrode of the capacitor 7 on the side toward point Q, the capacitor 7 is charged with the same time constant as set forth above immediately after the electric charge on the electrode on the side toward the point P is completely discharged. Such a state in which the electrode on the side toward point Q is positively charged is referred to hereinafter as that in which the capacitor 7 is negatively charged.

As set forth above, in the present unbalanced switching circuit 4, the negative switching voltage $Vsw$ relative to the negative half cycle of the alternating current is fairly low compared with the positive switching voltage $Vs$ relative to the positive half cycle of the current, so that even when the voltage charged in the capacitor 7 does not reach the positive switching voltage $Vs$ due to the predetermined value of the control resistance 6, it will nevertheless reach the negative switching voltage $Vsw$ during the negative half cycle of the alternating current.

Furthermore, before the motor 2 starts rotating, an effect such as is caused by the rotation of the motor is not exerted on the capacitor 7. Accordingly, soon after the capacitor is negatively charged, it reaches the switching voltage $Vsw$ and the switching operation is effected so as to trigger the bi-directional control rectifier 3, so that the negative current is supplied to the motor 2 from the AC source 1 through the point Q and the control rectifier 3 for the time period $To$ and, simultaneously, the capacitor 7 is discharged. With the electric power thus supplied motor 3 starts rotating.

Due to the rotation of the motor 2, a counter electro motive force is produced with the result that the electric potential at the point R is raised to decrease the flow of the discharged electric current from the capacitor 7 through the diode 8. Consequently, the time period during which the electirc potential of the capacitor 7 reaches the switching voltage $Vsw$ becomes gradually longer than that at the time of starting of the motor 2 and, finally, the motor reaches a fixed rotary speed which is determined by the electric potential V caused by the counter electro motive force of the motor and the time constant determined by the control resistance 6, resistance 9, capacitor 7 and diodes 8 and 8'.

Figure 3:
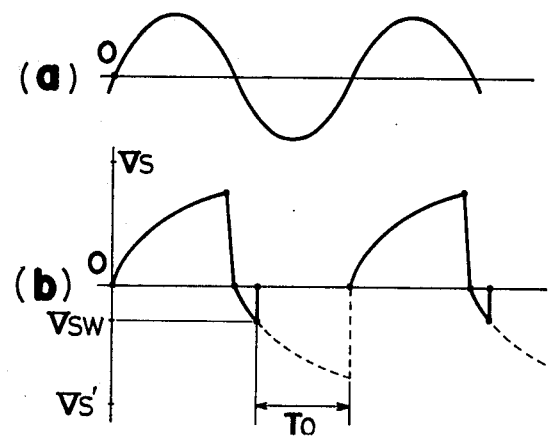
FIG. 3 to FIG. 5 are diagrams showing operational characteristics of terminal voltages of a capacitor used in the circuit of FIG. 1.
Figure 4:
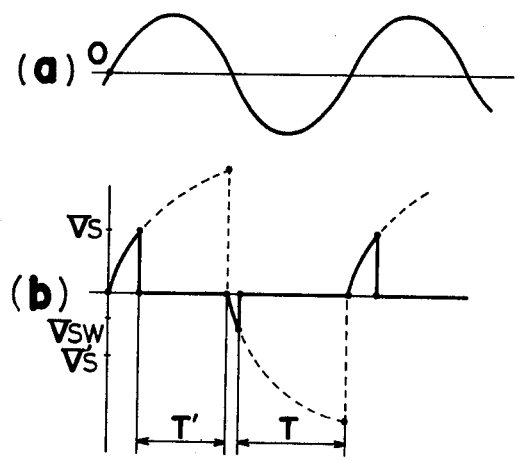
Figure 5:
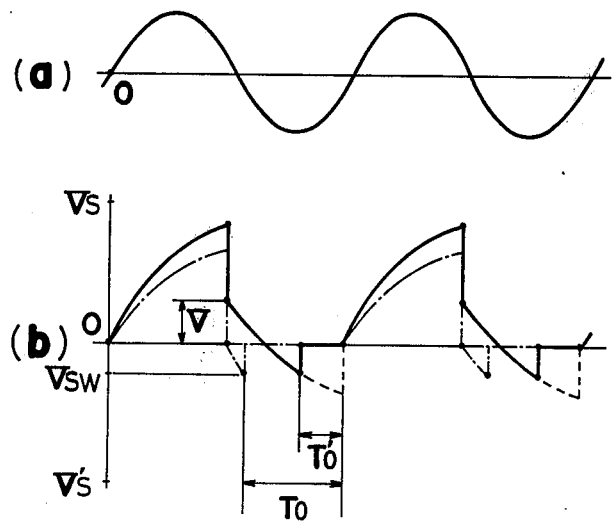

When the control resistance 6 is adjusted for low speed rotation of the motor 2, the time period during which the bi-directional control rectifier 3 to the motor 2 during each cycle of the AC source is reduced from $To$ at the time of start of rotation as shown in FIG. 3(b) to $To'$ at the normal fixed rotary speed of the motor as shown in FIG. 5(b).

When a load is applied to the motor 2 which has thus reached the normal rotary speed, the rotary speed of the motor is lowered due to the load. This lowering of the rotary speed of the motor instantaneously causes a reduction of the counter electro motive force (V) and, therefore, the conduction time period $To'$ of the bi-directional control rectifier 3 is increased so as to increase the supply of electric power to the motor. Thus, the circit functions to increase the torque and the rotary speed of the motor 2 in accordance with the load.

On the other hand, when the control resistance 6 is adjusted for the high rotary speed of the motor 2 by lowering the value of the resistance 6, the electric potential in the capacitor 7 is rapidly increased for each cycle of the AC source and, therefore, the unbalanced switching circuit 4 reaches the switching voltages $Vs$ and $Vsw$ during every cycle. Accordingly, the conductive time period of the bi-directional control rectifier 3, which becomes conductive when a trigger is applied to the gate terminal 5 thereof from the switching circuit 4, becomes $T'$ during the positive half cycle and $T$ during the negative half cycle. Thus, the conduction angles through the bi-directional control rectifier become such as to supply almost all the electric power of the AC source to the motor 2, so that the motor 2 is rotated at a high speed.

That is, when the value of the control resistance 6 is very small, the switching circuit 4 produces the trigger signals almost at the same time as the voltage applied thereto changes from positive to negative and from negative to positive, so that the bi-directional control rectifier does not substantially restrict the flow of electric current in either the positive or negative directions, with the result that the motor 2 is rotated at a rotary speed such as is obtained when the motor is directly connected with the AC source.

It should be noted that in such a high speed rotation of the motor the counter electro motive force produced thereby always keeps the electric potential at point A at a high level, so that the discharge of electric current through the diode 8 varies very little and the increase in the electric power supplied to the motor to compensate for the reduced rotary speed of the motor due to the load is small.

However, usually, since the motor has good torque characteristics in the high speed range, there is no problem in practical use when the motor having a good torque characteristic with respect to the load is selected for use.

In the thus described structure of the present invention, the variations of the counter electro motive force produced by the rotation of the motor cuases the changes in the charge and discharge time periods of the capacitor for each cycle of the AC source and exerts an influence upon the lower switching voltage of the unbalanced switching circuit so as to increase or decrease the conduction angle of the bi-directional control rectifier. Accordingly, when the rotary speed of the motor, which has been preset to have a predetermined rotary speed, varies due to loads applied to the motor, the conduction angle of the bi-directional control rectifier is varied to compensate for the speed changes of the motor and increases the torque thereof so as to maintain the rotary speed of the motor at the predetermined rotary speed.

When the present motor speed control means was compared with the known carbon-type motor speed control system applied to same commutator motor to determine the effect on the starting torque, the starting torque produced with the present control means was about four times as high as that produced with the known system in the slow speed range, and about five times as high as that with the known system in the intermediate speed range, while at the high speed range it was almost the same as that with the known system.

Also, when compared with the known control system using a semi-conductor such as SCR, the starting torque produced with the present motor speed control means was about two to three times as high as that with the semi-conductor control system in the slow and intermediate speed ranges and substantially same in the high speed range.

Figure 6:
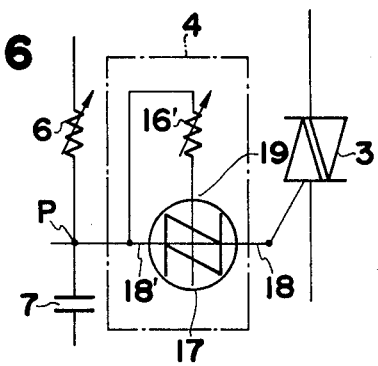
FIG. 6 is a diagram of an electric circuit of another embodiment of the speed control means for an AC commutator motor according to the present invention.

Shown in FIG. 6 is another embodiment of the unbalanced switching circuit in which a bi-directional silicon switching element 17 (for example, MITUBISHI BS08A) having substantially symmetrical positive and negative switching voltages at both anodes 18 and 18' thereof is used, in which one anode 18 is connected to the gate of the bi-directional control rectifier and the other anode 18' is connected to the junction P between the capacitor 7 and the control resistance 6. A semifixed resistance 16' (for example, 50 KΩ) is connected between the gate 19 of the switching element 17 and the anode 18' connected to the capacitor 7.

In this structure of the unbalanced switching circuit 4, the circuit is formed by a reduced number of elements, i.e., two diodes, two or three resistances, a capacitor, a bi-directional control rectifier, and a bi-directional switching element. Furthermore, when the switching circuit is formed as an integrated circuit, one more resistance can be omitted so as to minimize the number of circuit elements, and a motor speed control circuit of high ability and utility can be produced according to the present invention.

Figure 9:
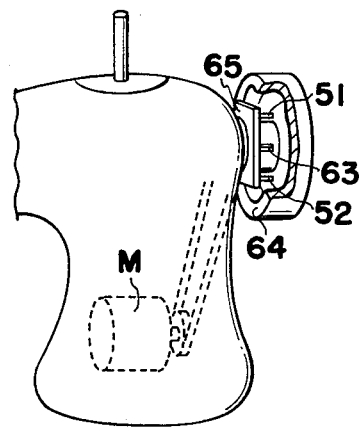
FIG. 9 is a partially broken away perspective view showing switches attached to an electric sewing machine using the position setting means.
Figure 7:
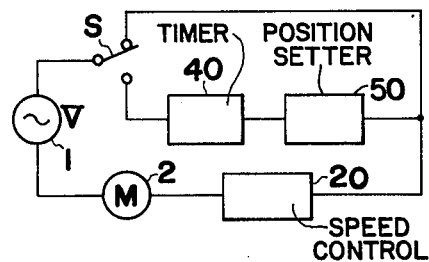
FIG. 7 is a block diagram showing a position setting means for the AC motor used in connection with the speed control means.
Figure 8:
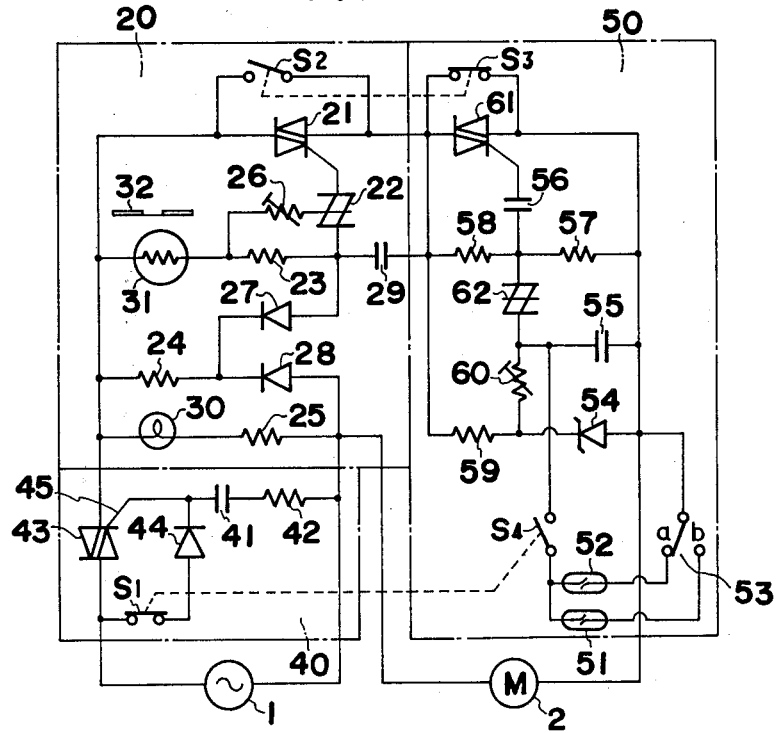
FIG. 8 is a diagram of an electric circuit for the position setting means of FIG. 7.

Shown in FIGS. 7 to 9 is an embodiment in which the present motor speed control means is used in connection with a position setting means applied for a periodically operated machines such as a sewing machine. The position setting means shown in this embodiment is designed to stop the operation of the electric sewing machine when the needle thereof comes to a predetermined position.

The essential structure of the position setting means is shown in the block diagram of FIG. 7 in which the motor 2 for an electric sewing machine is connected with the AC source 1 through a switch S and the speed control means 20, whereby in a normal operation, the rotary speed of the motor 2 is controlled so as to be the desired speed by the speed control means 20 in the manner as described hereinbefore with reference to FIGS. 1 to 6. On the other hand, when the rotation of the motor is to be stopped, the position of the switch S is changed over to supply the electric current to the motor 2 through a timer 40 and a position setting circuit 50. The timer 40 and the position setting circuit 50 are constructed in such a manner that the motor 2 keeps rotating until the needle of the sewing machine comes to a predetermined position. The time period set by the timer 40 is made long enough to cover the period during which the needle of the sewing machine which is at a certain position when the switch is changed over can move to the predetermined position. Soon after the rotation of the motor is stopped by the action of the position setting circuit 50, the timer 40 opens. Thus, the supply of the electric current to the motor is interrupted, so that the motor cannot be rotated again unless the switch S is changed over again.

When the above described position setting means is to be put into practical circuit, some problems have to be solved, such as rapid and correct operation thereof and the variance of the voltage of the AC source.

Shown in FIG. 8 is a practical electric circuit constructed to take into account the above problems and used in connection with an electric sewing machine. In the circuit shown in FIG. 8, two pairs of switches $S_1-S_4$ and $S_2-S_3$ are each operatively connected so as to be in a normal operative position as shown in FIG. 8 or the opposite or stopping positions which are the reverse of the positions shown in FIG. 8.

The timer 40 comprises a capacitor 41 and a resistance 42 connected in series for setting a time period of the timer 40, a bi-directional control rectifier 43 such as a connected in series with the AC source 1 and the motor 2, and a diode 44 connected in series with the switch $S_1$ for supplying the electric current to the capacitor 41 and triggering the gate 45 of the bi-directional control rectifier 43.

The speed control circuit 20 comprises a bi-directional control rectifier 21, switching element 22, resistances 23, 24 and 25, a semifixed resistance 26 for speed control of the motor, diodes 27 and 28, a capacitor 29, a lamp 30, a short-circuiting switch $S_2$, a photoconductive cell 31 such as CdS, and a speed governor plate 32 for adjusting the intensity of light emitted from the lamp 30 to the photoconductive cell 31. The speed control circuit 20 of this embodiment is essentially the same as those of FIGS. 1 and 6 in its structure and functions, except that the speed control of the motor is effected by the intensity of light.

The position setting circuit 50 essentially comprises lead switches 51 and 52 the contacts of which are closed by magnetic force, and a selection switch 53. In addition to these switches, the circuit 50 further comprises a voltage regulator diode 54, capacitors 55 and 56, resistances 57, 58 and 59, a semifixed adjusting resistance 60, a bi-directional control rectifier 61, a switching element 62 for triggering the gate of the rectifier 61, and short-circuiting switches S₃ and S₄.

A magnetic piece 63 for actuating the lead switches 51 and 52 is attached to a pulley 64 of the sewing machine as shown in FIG. 9, while the lead switches 51 and 52 are fixed to a plate 65 at positions corresponding to the upper and lower dead center points of the sewing needle, respectively. The contact point a, to which the selection switch 53 is connected in FIG. 8, that for the upper dead center point of the needle.

With the structure of the circuit as shown in FIG. 8; when the switches S₁-S₄ are changed over to the opposite positions to stop the operation of the sewing machine, the supply of electric current to the gate of the rectifier 43 through the diode 44 is interrupted when the switch S₁ opens, but an electric current is supplied to the gate from the charged capacitor 41, so that the bi-directional control rectifier 43 is still conductive for the time period necessary for setting the position of the needle of the sewing machine to the predetermined position. On the other hand, the speed control circuit 20 is short-circuited by the closing of the switch S₂, so that the circuit 20 is in a condition to rotate the motor at the highest rotary speed.

In the position setting circuit 50, when the switch S₃ is opened, the electric current to the motor 2 is supplied through the bi-directional control rectifier 61, whereby the motor 2 is operated at such a slow speed that the lead switches 51 and 52 can postively function in connection with the magnetic piece 63. Accordingly, when the magnetic piece 34 closely approaches the lead switch 52, the switching element 62 and the bi-directional control rectifier 61 stop functioning and, therefore, the needle of the sewing machine stops moving at the upper dead point thereof. Further, in the timer 40, the electric potential in the capacitor 41 gradually decreases due to the discharge thereof, so that soon after the stopping of the movement of the sewing machine, the bi-directional control rectifier 43 becomes non-conductive. Thus, even when the relative positions of the lead switch 52 and the magnetic piece 63 are changed or shifted by an operator who manually moves the pulley 64, the motor cannot be rotated any more because the supply of electric current thereto is interrupted.

The voltage regulator diode 54 in the position setting circuit 50 is provided to supply a fixed amount of electric current to the motor through the switching element 62 and the bi-directional control rectifier is provided in order that the motor 2 will be rotated at an optimum slow speed irrespective of the variance of the voltage of the AC source 1. By the provision of such a voltage regulator diode 54, even when the AC source of 100V in increased 10 to 15%, the rotary speed of the magnetic piece 63 rotated by the rotation of the motor is not increased to a degree which hinders the function of the magnetic piece 63 and the lead switches 51 and 52 for stopping the motor 2 and, on the contrary, even when the AC source of 100V is decreased 10 to 15%, the rotary speed of the magnetic piece 63 is not decreased to a degree which makes the operator irritated due to the slow speed of the motor.

When it is desired to stop the operation of the sewing machine where the needle of the machine is at the lower dead center point thereof, nothing is required other than a manual operation to change over the selection switch 53 to the other contact b, because the other lead swtich 51 functions like the lead switch 52 to stop the motor.

After the motor has thus stopped rotating, when it is desired to again rotate the motor, the switches S₁ to S₄ are changed over to the positions shown in FIG. 8, in which the timer 40 as well as the position setting circuit 50 does not function and only the speed control circuit 20 functions and controls the rotary speed of the motor to the desired low or high speed in accordance with the desired conditions by means of the speed governor plate 32.

According to the position setting circuit thus provided in connection with the present speed control circuit of the motor, when the motor stops rotating at a predetermined position, the supply of electric current to the motor and to the associated circuits is cut off, so that even when the rotary position of the motor is shifted from the predetermined stopped position for some reason, the motor can no longer be rotated. Such position setting means of the motor is very advantageous and safe compared with the known one in which when the rotary position of the motor is shifted manually or for some other reason from the predetermined stopped position, the motor starts rotating suddenly due to the action of the automatic position resetting means.

The advantage of the present position setting means is especially great when used with such machines like electric sewing machines in which the motor cannot be rotated in the reverse direction and further the sewing machine has to be reset by rotating the motor for an additional cycle thereof when the rotary position thereof has shifted for some reason, or such machines in which manual operations are required to complete the mechanical operation which has been carried out by using the motor.

In addition to the advantages set forth above, the position setting circuit can be formed of a small number of electrical parts and simple wiring and can easily be applied to an electric sewing machine without requiring any substantial alterations therein and in connection with the present motor speed control circuit.

Although the present invention has been described with reference to the preferred embodiments thereof, many modifications and alterations may be made within the spirit of the present invention.

What is claimed is:

1. A speed control means for an AC motor comprising:
    a bi-directional rectifier adapted to be connected in series with an AC motor and a power source;
    a control circuit connected in parallel with said bi-directional rectifier and having a variable resistance element and a capacitor connected in series, the side of said capacitor opposite the side connected to said variable resistance element being adapted to be connected to one side of said motor;
    an unbalanced switching circuit connected between the gate terminal of said bi-directional rectifier and the junction between said variable resistance element and said capacitor and having different absolute values of positive and negative switching voltages;
    a fixed resistance and a first diode connected in series and being adapted to be connected in parallel with said power source, the anode of said first diode being adapted to be connected to the other side of said AC motor; and
    a second diode havng the cathode thereof connected to the junction between said fixed resistance and said first diode and the anode connected to the junction between said variable resistance element and said capacitor, whereby when the speed of rotation of the motor tends to increase, the time during which said bi-directional control rectifier is conductive is reduced, whereas when the speed of rotation of the motor tends to decrease, the time during which said bi-directional control rectifier is conductive is increased, thereby to keep the rotary speed of said motor constant.

2. A speed control means as claimed in claim 1, wherein said unbalanced switching circuit comprises:
   two symmetrically connected circuit portions each having a voltage regulator diode, two transistors in parallel with said voltage regulator diode and a resistance coupled between the anode of said voltage regulator diode and the base of one of said transistors for preventing leakage; and
   a semi-fixed resistance connected in parallel to one of said voltage regulator diodes.

3. A speed control means as claimed in claim 1, wherein said unbalanced circuit comprises:
   a bi-directional silicon switching element which has substantially symmetrical positive and negative switching voltages at the both anodes thereof, one of the anodes thereof being connected to the gate of said bi-directional control rectifier and the other being coupled to the said variable resistance element; and
   a semi-fixed resistance connected between the gate of said silicon switching element and said anode which is coupled to said variable resistance element.

4. A speed control means as claimed in claim 1, wherein said variable resistance element is a photoconductive cell.

5. A speed control means as claimed in claim 1, further comprising a timer and a position setting circuit coupled in series, and a switch means coupled with said speed control means for switching said timer and position setting circuit into and out of series with said motor and speed control means said timer comprising means for permitting supply of the electric current to said motor until the motor stops rotating at a predetermined position by the action of said position setting circuit and thereafter ending said supply of current.

* * * * *